Oct. 27, 1936.  R. P. DINSMORE  2,058,778
PNEUMATIC TIRE AND FABRIC THEREFOR
Filed Nov. 21, 1932   2 Sheets-Sheet 1
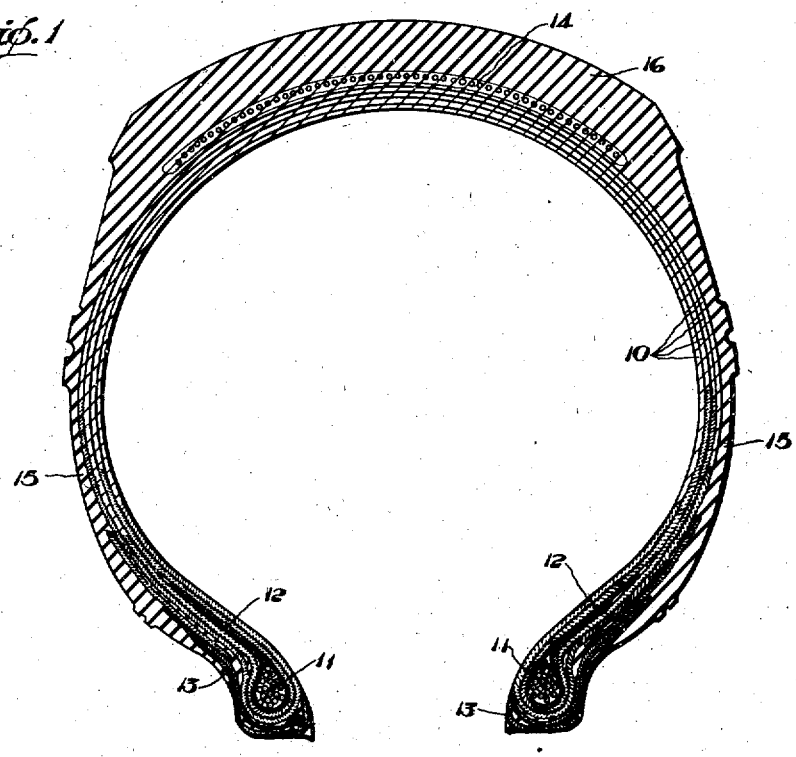
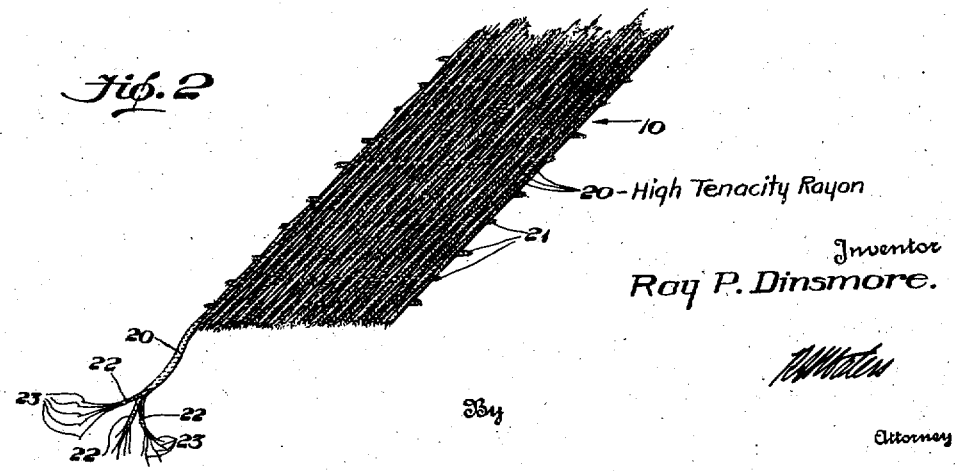
Inventor
Ray P. Dinsmore.

Patented Oct. 27, 1936

2,058,778

UNITED STATES PATENT OFFICE 2,058,778

PNEUMATIC TIRE AND FABRIC THEREFOR

Ray P. Dinsmore, Akron, Ohio, assignor to Wingfoot Corporation, Wilmington, Del., a corporation of Delaware Application November 21, 1932, Serial No. 643,594

18 Claims. (Cl. 152—13)

This invention relates to cord fabrics and to pneumatic tires constructed thereof, and it refers more particularly to the use of a new material for such articles of manufacture.

According to accepted standard practice, tires are built up of a number of plies of rubberized fabric composed of cotton cords, either squarewoven, weftless, or with a light filler thread. Although tires constructed of such cotton cords or fabrics have given good results, particularly when embodying higher-twist cords as disclosed in Patent No. 1,632,201, of S. A. Steere, they have certain inherent limitations constituting a difficult problem by reason of the increasing speeds and loads resulting from advances in other departments of automotive engineering. Obviously, increases in the operating load and speed of a tire will subject the various parts of it to stresses of increased magnitude and frequency, tending to develop weaknesses which are manifested particularly in the larger sizes of tires, such as those which are used on passenger busses, commercial trucks, trailers, and the like. One of these difficulties comes from excessive heat that is generated within the tire carcass by friction between the adjacent particles of the cotton and rubber, as well as actual frictional contact of fiber with fiber, due to the extreme and rapid flexing in operation. Experience and extensive tests have shown that under the influence of increasing temperatures there in an increasing likelihood of tire failure, due to a falling-off in the tensile strength of cotton cords to a point where they can no longer dependably carry the loads to which they are subjected.

In the past, numerous attempts have been made to construct tires using materials other than cotton cords for the structural elements but such attempts have not met with practical success. Natural silk, for example, while structurally suitable, at least for limited use in such tires, as for instance, light service in bicycle racing tires, has been much too costly to warrant its adoption for standard automobile tires. Metallic wire, which has been tried in several forms, has been too heavy, difficult to insulate with the essential rubber, and not sufficiently flexible or elastic to provide the desired degree of riding comfort in a tire. Artificial silk has been considered entirely unsuitable because, among other disqualifications, of its inability to withstand injury from moisture to which it would be subjected in a tire. Not only has the artificial silk which has been available prior to this invention been characterized by a relatively low tensile strength when wet, but it has also been considered unsuitable for tires because of its low elastic limit and consequent inability to "come back" after elongation within certain limits.

I have found, however, contrary to expectations and teachings in the art, that I can produce a greatly improved pneumatic tire, using artificial silk instead of cotton in the carcass. The term "artificial silk" is here used in its broadest sense and is intended to include not only rayons and other regenerated cellulose filaments but all other synthetic filaments or fibers which might be capable of incorporation in load-bearing cords. For this purpose I use, for example, a high-tenacity rayon or other synthetic material, which is not seriously affected by moisture and which has a much higher tensile strength than cotton when hot. More specifically, the rayon or other material which I employ possesses certain physical properties which are graphically illustrated by a stress-strain curve that is substantially a straight line, or, as a whole, tending to be slightly concave to the axis of strain, all as hereinafter more fully explained. Tires constructed from such materials are able to withstand the heavy loads to which they are subjected at high speeds without undue likelihood of premature failure from blow-outs. In addition to this safety factor which is particularly vital for high-speed passenger bus transportation, the tires embodying this invention are economical in operation because they give greater mileage than do similarly constructed cotton cord tires under operating conditions which tend to develop excessive temperatures.

Thus, the above-mentioned and other objectionable features and limitations of the prior art are overcome by the present invention, which has among its objects: (1) to provide a pneumatic tire which possesses characteristics superior to those of the various prior art structures, and one which can be produced with practical economy; (2) to provide such a tire that can readily be manufactured with present equipment and methods; and (3) to produce new and beneficial properties in a fabric of the class described for use in constructing such tires, as well as other articles of manufacture. With these and other objects in view, the invention resides in the novel features of construction hereinafter described and particularly pointed out in the appended claims.

In the accompanying drawings, which form a part of this application, one embodiment of the invention has been shown merely by way of illustration.

Figure 1 is a transverse sectional view through a tire having a carcass embodying the invention;

Figure 2 is a fragmentary perspective view of a piece of the improved fabric depicting one of several forms in which it may be woven.

Figure 3:
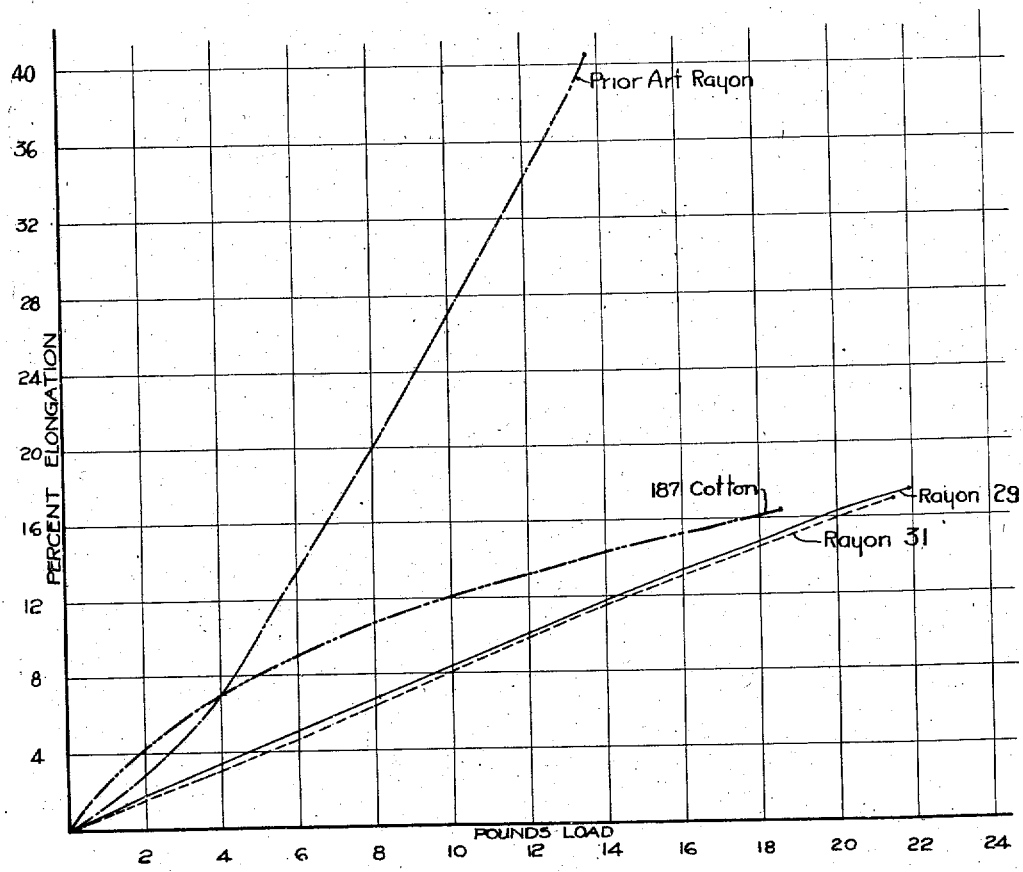
Figure 3 is a diagrammatic comparison of stress-strain curves of several different cords.

In Fig. 1 of the accompanying drawings, the invention has been shown conventionally as embodied in a pneumatic tire of standard form, such tire having a carcass built up of the improved fabric plies 10 having their side edges tied in with circular reinforcing beads 11, flipper strips 12 and chafing strips 13. A central circumferential breaker strip 14, rubber side walls 15 and tread 16 complete the assemblage. As will be recognized by those skilled in this art, the number of fabric plies employed and the specific method of tying in the beads may vary for different sizes and grades of tires, these being features of tire design with which this invention is not particularly concerned.

The invention is not limited in this respect, but the standard tire constructions are preferred because they make possible the immediate practice of the invention without any radical changes in present manufacturing methods and machinery.

Each of the fabric plies 10 is composed of a plurality of closely arranged parallel cords 20 of high-tenacity synthetic fibers or filaments such as rayon, which may be either cross-woven or pickless if desired, or woven with light filler threads 21, as shown in Fig. 2. Preferably, the fabric from which the plies are formed is provided with a thin coating of rubber, as by calendering or impregnating, whereby to effect proper adhesion of the several plies in the carcass; such treatment may follow the conventional practices as applied to processing cotton cord and other fabrics for the same purpose. The individual cords 20 function in the plies 10 as load-bearing elements extending, as they do, from one bead 11 to the other, and on a bias with reference to the central circumferential plane of the tire. It is for this reason that they are required to have substantial tensile strength. Of course, the invention contemplates that these novel cords, and fabrics composed of said cords, may be employed in breaker strips or other parts of tires, as well as in belting, hose and other articles of manufacture wherein the unique properties of this material will be especially advantageous.

The cords 20 are twisted from regenerated cellulose or other artificial silk filaments, and are characterized by substantial tensile strength which is not critically reduced by either moisture or heat to which they are subjected in a tire. Of course, there may be some reduction in tensile strength, due to the heat, and the significance of the term "critical reduction" and others of similar import as used in this specification and the appended claims is that the invention shall embrace cords whose tensile strength at a temperature of 250° F. will not be substantially less than 66% of such strength as measured at ordinary room temperature. Similarly, the cords when saturated with moisture should have a tensile strength not substantially less than 66% of that as measured at normal room humidity. Although tire cord is occasionally subjected to the action of high moisture, during tire operation, due to cuts which extend through the outer rubber covering, unrepaired cuts are not common and are localized to a portion of one or two plies. Hence, to a substantial degree, even in cases where the cord is saturated with water, this factor is not of such great importance as the maintenance of tenacity under the effect of high temperature. As compared with prior art cotton cords, the novel cords of this invention have a much higher hot tensile strength, and while they have slightly less elongation than do cotton cords, they have been found to have sufficient elongation for the purpose and, in general, they have characteristics far superior to those of other materials which have heretofore been used in constructing tires. The filaments which compose the cords 20 may be produced by any one of the several processes known to those skilled in the synthetic fiber industry as, for example, by the cellulose nitrate process, the cuprammonium process, the viscose process, or the cellulose acetate process, but satisfactory results may be produced by the viscose process and more particularly by the novel modifications thereof which are disclosed in the pending application, Serial Number 676,463, filed June 19, 1933, by Parker, and in the applications of Bradshaw and Hoff, Serial Numbers 303,574 and 655,738. Briefly, the process comprises shredding purified linters or wood pulp which have been saturated with a strong caustic soda solution, ageing the shredded soda-cellulose crumbs, reacting with carbon disulphide to form sodium cellulose xanthate, dissolving this in alkaline solution, forcing the resultant viscose solution through a filter and spinneret in an acid precipitating bath, and finally collecting and spinning the filaments regenerated in the acid bath.

The yarns produced by the process just briefly described, or by any other process that might be preferred, are then twisted into the cords 20 which, as to specification, are not limited by the present invention. In other words, the number of yarns used, the number of twists per inch, and the directions of twists of the several components may vary for different cords in accordance with established principles of cord design. For example, the cords shown in Fig. 2 of the drawings are of three-ply construction, each cord comprising three twisted strands 22, each formed of five yarns 23, and each yarn being twisted of one hundred and twenty filaments. Briefly, such a cord is referred to as of 275-120/5/3 construction, but this is given merely by way of illustration and it is to be understood that the invention embraces cords of other specific constructions. The number of turns per inch of the filaments in each yarn 23 is known as the singles twist; the number of turns per inch of the five yarns which compose each strand 22 is known as the intermediate twist, and the number of turns per inch of the three strands which compose the cord 20 is known as the cable twist. The relative directions of these twists may be RRL, LLR, RLR or LRL. Numerous samples of artificial silk cords with different degrees and directions of twists have been made up and tested, and by way of further example but without intention to limit the invention to rayon, data relative to a few of such cords and their tests are tabulated and compared with a standard cotton cord as follows:

|  | Cotton | Rayon | Rayon | Rayon |
|---|---|---|---|---|
| Sample number | 187 | 29 | 31 | 39 |
| Denier |  | 275 | 275 | 275 |
| Filaments |  | 120 | 120 | 120 |
| Construction | 23/5/3 | -/5/3 | -/5/3 | -/5/3 |
| Twist direction | RRL | LRL | LRL | RLR |
| Cable twist, turns per inch | 9.6 | 10.2 | 9.8 | 9.90 |
| Intermediate twist | 20.2 | 18.5 | 19.9 | 02.4 |
| Single twist | 21.2 | 4.1 | 5.7 | 7.0 |
| Wt. grams/meter | .49 | .57 | .57 | .56 |
| Tensile-normal (lbs. pull) | 17.7 | 21.4 | 21.6 | 16.7 |
| Tensile hot (250° F. (lbs. pull)) | 11.5 | 17.7 | 18.1 | 15.6 |
| Normal tensile/gram meter | 36.0 | 37.5 | 37.7 | 29.6 |
| Hot tensile/gram meter | 23.4 | 31.0 | 31.6 | 27.9 |
| Ultimate elongation percent | 16.0 | 17.0 | 16.6 | 14.4 |

Note: The sample numbers, where reproduced on the chart of Fig. 3, correspond with those appearing in the foregoing table.

The cotton cord #187 listed in the first column of the foregoing table is one which has been very extensively used in tires produced for sale and one which, as cotton cords go, has been considered highly successful. By comparing the corresponding figures in the four columns of the table, it will be noticed that the singles twist in the rayon cords are very much lower than in the cotton cord. The high singles twist is necessary in the cotton cord in order to interlock the fibers properly to give tensile strength, whereas in rayon the elementary filaments do not require such high twist for interlocking. In fact, it has been found that the tensile strength of rayon yarns decreases as the singles twist goes up. But, apart from this, the low singles twist of the rayon gives an unexpected advantage in the present invention because it promotes adhesion to rubber, and this is an important consideration. In some rayon samples which have been provided for test, it was found that the strongest yarn was obtained with a twist of about 8.5 turns per inch, but that strongest cord from the same size yarn was obtained with a singles twist or yarn twist of about 5 turns per inch.

The weight of rayon cords in grams per meter is slightly higher than that of equivalent cotton cords, as may be seen from the table, but this difference in weight is not sufficient to cause any objection. It is possible, however, to design the rayon cords so that they will actually be lighter in weight than cotton cords, so that a finished tire embodying the invention will weigh less than a tire similarly constructed of cotton cords.

One of the principal characteristics of this high-tenacity rayon that renders it capable of successful use in tires is its hot tensile strength, which is considerably higher than that of cotton. Thus, for example, it will be seen that the tensile strength of the cotton cord 187 when heated to 250° F. was only 11.5 pounds, whereas those of the three examples of rayon under the same conditions were 17.7, 18.1 and 15.6. By reason of this fact, heat blow-outs will be considerably reduced by using the present invention, and this is accomplished without sacrificing riding comfort. In other words, driving safety is increased by the invention.

The tensile strength and elongation properties of the cords may, of course, be determined in various ways as, for example, by the use of a Scott testing machine, well known to those skilled in the art. While the actual numerical values may differ when obtained with different kinds of machines, the relative proportions of these values will be the same for any given machine. By referring to Fig. 3, a quick visual comparison may be made of the elongation properties of the four cords listed in the table, as well as of a prior art rayon cord. From this chart it will be seen that the stress-strain curve of the high-tenacity rayon is substantially straight, or even tending toward concavity to the axis of strain, with a substantially uniform degree of elongation throughout the expected range of tension, whereas the curve of the prior art rayon bends critically upward and shows that the cord has entirely too much elongation to be suitable for use in tires. Experience has shown that elongation to a certain extent is necessary in order to provide riding comfort in the tire, but that in this respect the prior art rayons have been entirely unsuitable. The new high-tenacity cords of synthetic filaments or fibers, on the other hand, have proved their superiority, contrary to expectations.

Another striking feature of the improved cords is that they have much greater durability than do cotton cords. In other words, their fatigue properties, or rather resistance to fatigue, are far superior to those of cotton. This test can be made in several ways, one being to oscillate the cords rapidly under tension, over a small diameter pulley, thus subjecting them to sudden and sharp bending stresses. The time elapsing before the cords break gives durability values by which these properties of the cords may be compared. Of the many samples which have been comparatively tested in this way, one piece of the improved rayon cord showed a durability fifteen times greater than that of the most durable cotton cord, whereas by averaging all of the test results, it appears that the rayon cords have a durability well in excess of five times that of cotton cords.

As has previously been stated, the novel high-tenacity cords may be woven or otherwise fabricated in any desired manner to facilitate their embodiment in tires and other articles of manufacture. In some instances, it may be desirable to treat the cords initially with an impregnating binder such as rubber cement or latex, whereby to improve adhesion between the cords and the rubber in the tire, such treatment being possible either before or after the cords are prepared in fabric form, and before the calendering or impregnating operation. The specific steps and materials used for such treatment may vary considerably, and in this respect the present invention is not limited.

A number of tires of different sizes have been built of fabrics embodying these high-tenacity rayon cords, and have been tested in various ways and under severe conditions in comparison with cotton control tires. The results of these tests gratifyingly prove that the tires so constructed have superior characteristics, and particularly that they are not subject to heat blow-outs. Such tires have shown much greater mileage values on the resilometer, and indications are that they will fill a need for a safter tire in transport work.

Obviously, the invention is susceptible of modifications other than those specifically referred to, and the right is herein reserved to make such changes as fall within the scope of the appended claims, without departing from the spirit of the invention.

Having thus described my invention, what I claim is:

1. A tire having a carcass comprising a plurality of plies of artificial-silk cord fabric, the artificial-silk cords of said fabric having a high tenacity and being each composed of a plurality of plied yarns wherein the yarn twist is less than half of the ply twist.

2. A tire having a carcass comprising a plurality of plies of artificial-silk cord fabric, the artificial-silk cords of said fabric having a high tenacity and being each composed of a plurality of plied yarns wherein the ply twist is from three to four times as great as the yarn twist.

3. A tire having a carcass comprising a plurality of plies of artificial-silk cord fabric, the artificial-silk cords of said fabric having a high tenacity and being each composed of a plurality of plied yarns wherein the ply twist is in a range of from 2½ to 4½ times as great as the yarn twist, and the cords being further characterized by an ultimate elongation in excess of 10% when tested at 250° F.

4. In or for a tire or the like, a cord built up of continuous filaments of high-tenacity artificial silk and characterized by a singles twist or yarn twist which is less than half of the ply twist.

5. In or for a tire or the like, a cord built up of continuous filaments of high-tenacity artificial silk and characterized by a low singles twist which ranges from approximately ⅓ to approximately ¼ of the ply twist.

6. In or for a tire or the like, a cord built up of continuous filaments of high-tenacity artificial silk and characterized by an ultimate elongation in excess of 10% when tested at 250° F., the cord having a ply twist in a range of from 2½ to 4 times as great as the yarn twist.

7. A tire having a carcass built up of artificial-silk cord fabric, the artificial-silk cords of said fabric having a high tenacity and being each twisted of a plurality of initially twisted yarns, the initial yarn twist being 12 or less turns per inch and the final cord twist being greater than said initial yarn twist.

8. A tire having a carcass built up of artificial silk cord fabric, the artificial silk cords of said fabric having a high tenacity and each cord being twisted of a plurality of intermediate strands which in turn are twisted of a plurality of twisted yarns, the initial yarn twist being less than the cable twist.

9. A tire having a carcass built up of artificial silk cord fabric, the artificial silk cords of said fabric having a high tenacity and each cord being twisted of a plurality of intermediate strands which in turn are twisted of a plurality of twisted yarns, the initial yarn twist being less than the intermediate twist.

10. A tire having a carcass built up of artificial silk cord fabric, the artificial silk cords of said fabric having a high tenacity and each cord being twisted of a plurality of intermediate strands which in turn are twisted of a plurality of twisted yarns, the initial yarn twist being less than either the intermediate twist or the cable twist.

11. In or for a tire, belt or the like, a cord formed of artificial silk with high tenacity, said cord being twisted of a plurality of initially twisted yarns, the initial yarn twist being 12 or less turns per inch and the final cord twist being greater than said initial yarn twist.

12. In or for a tire, belt or the like, a cord twisted from a plurality of yarns of artificial silk filaments made up with a low singles twist of not more than 12 turns per inch.

13. In or for a tire, belt or the like, a cord formed from continuous filaments of artificial silk and having high tenacity, said cord being twisted of a plurality of intermediate strands which in turn are twisted of a plurality of twisted yarns, the initial yarn twist being not more than 12 turns per inch and being less than either the intermediate twist or the cable twist.

14. In or for a tire, belt or the like, a cord twisted from a plurality of yarns of artificial silk filaments made up with a low singles twist of 12 turns or less per inch, the cord being lightly coated with an adhesive having a mutual affinity for rubber and for the artificial silk.

15. In or for a tire, belt or the like, a cord built up of continuous filaments of high-tenacity artificial silk and characterized by a singles twist or yarn twist which is less than half of the ply twist, the cord being lightly coated with an adhesive having a mutual affinity for rubber and for the artificial silk.

16. A tire having a carcass comprising a plurality of plies of artificial silk cord fabric, the artificial silk cords of said fabric having a high tenacity and being each composed of a plurality of plied yarns wherein the yarn twist is less than half of the ply twist, the cords being lightly coated with an adhesive having a mutual affinity for rubber and for the artificial silk.

17. In or for a tire, belt or the like, a cord of artificial silk, said cord comprising a plurality of plied yarns of artificial silk wherein the yarn and cable twists are less than the ply twist and the yarn twist is also less than the cable twist.

18. A tire having a carcass built up of artificial silk cord fabric, the cords of said fabric having a high tenacity and being each twisted of a plurality of initially twisted yarns, the initial yarn twist being 12 or less turns per inch and the final cord twist being greater than said initial yarn twist, the cords in said fabric being coated with an adhesive having a mutual affinity for rubber and for the artificial silk.

RAY P. DINSMORE.

---

CERTIFICATE OF CORRECTION.

Patent No. 2,058,778.  October 27, 1936.

RAY P. DINSMORE.

It is hereby certified that error appears in the printed specification of the above numbered patent requiring correction as follows: Page 1, first column, line 32, for "in" read is; page 2, second column, line 68, in the last column of the tabulation, for "02.4" read 20.4; page 3, second column, line 46, for "safter" read safer; and that the said Letters Patent should be read with these corrections therein that the same may conform to the record of the case in the Patent Office.

Signed and sealed this 29th day of December, A. D. 1936.

Henry Van Arsdale
Acting Commissioner of Patents.

(Seal)

by an ultimate elongation in excess of 10% when tested at 250° F.

4. In or for a tire or the like, a cord built up of continuous filaments of high-tenacity artificial silk and characterized by a singles twist or yarn twist which is less than half of the ply twist.

5. In or for a tire or the like, a cord built up of continuous filaments of high-tenacity artificial silk and characterized by a low singles twist which ranges from approximately ⅓ to approximately ¼ of the ply twist.

6. In or for a tire or the like, a cord built up of continuous filaments of high-tenacity artificial silk and characterized by an ultimate elongation in excess of 10% when tested at 250° F., the cord having a ply twist in a range of from 2½ to 4 times as great as the yarn twist.

7. A tire having a carcass built up of artificial-silk cord fabric, the artificial-silk cords of said fabric having a high tenacity and being each twisted of a plurality of initially twisted yarns, the initial yarn twist being 12 or less turns per inch and the final cord twist being greater than said initial yarn twist.

8. A tire having a carcass built up of artificial silk cord fabric, the artificial silk cords of said fabric having a high tenacity and each cord being twisted of a plurality of intermediate strands which in turn are twisted of a plurality of twisted yarns, the initial yarn twist being less than the cable twist.

9. A tire having a carcass built up of artificial silk cord fabric, the artificial silk cords of said fabric having a high tenacity and each cord being twisted of a plurality of intermediate strands which in turn are twisted of a plurality of twisted yarns, the initial yarn twist being less than the intermediate twist.

10. A tire having a carcass built up of artificial silk cord fabric, the artificial silk cords of said fabric having a high tenacity and each cord being twisted of a plurality of intermediate strands which in turn are twisted of a plurality of twisted yarns, the initial yarn twist being less than either the intermediate twist or the cable twist.

11. In or for a tire, belt or the like, a cord formed of artificial silk with high tenacity, said cord being twisted of a plurality of initially twisted yarns, the initial yarn twist being 12 or less turns per inch and the final cord twist being greater than said initial yarn twist.

12. In or for a tire, belt or the like, a cord twisted from a plurality of yarns of artificial silk filaments made up with a low singles twist of not more than 12 turns per inch.

13. In or for a tire, belt or the like, a cord formed from continuous filaments of artificial silk and having high tenacity, said cord being twisted of a plurality of intermediate strands which in turn are twisted of a plurality of twisted yarns, the initial yarn twist being not more than 12 turns per inch and being less than either the intermediate twist or the cable twist.

14. In or for a tire, belt or the like, a cord twisted from a plurality of yarns of artificial silk filaments made up with a low singles twist of 12 turns or less per inch, the cord being lightly coated with an adhesive having a mutual affinity for rubber and for the artificial silk.

15. In or for a tire, belt or the like, a cord built up of continuous filaments of high-tenacity artificial silk and characterized by a singles twist or yarn twist which is less than half of the ply twist, the cord being lightly coated with an adhesive having a mutual affinity for rubber and for the artificial silk.

16. A tire having a carcass comprising a plurality of plies of artificial silk cord fabric, the artificial silk cords of said fabric having a high tenacity and being each composed of a plurality of plied yarns wherein the yarn twist is less than half of the ply twist, the cords being lightly coated with an adhesive having a mutual affinity for rubber and for the artificial silk.

17. In or for a tire, belt or the like, a cord of artificial silk, said cord comprising a plurality of plied yarns of artificial silk wherein the yarn and cable twists are less than the ply twist and the yarn twist is also less than the cable twist.

18. A tire having a carcass built up of artificial silk cord fabric, the cords of said fabric having a high tenacity and being each twisted of a plurality of initially twisted yarns, the initial yarn twist being 12 or less turns per inch and the final cord twist being greater than said initial yarn twist, the cords in said fabric being coated with an adhesive having a mutual affinity for rubber and for the artificial silk.

RAY P. DINSMORE.

---

CERTIFICATE OF CORRECTION.

Patent No. 2,058,778.  October 27, 1936.

RAY P. DINSMORE.

It is hereby certified that error appears in the printed specification of the above numbered patent requiring correction as follows: Page 1, first column, line 32, for "in" read is; page 2, second column, line 68, in the last column of the tabulation, for "02.4" read 20.4; page 3, second column, line 46, for "safter" read safer; and that the said Letters Patent should be read with these corrections therein that the same may conform to the record of the case in the Patent Office.

Signed and sealed this 29th day of December, A. D. 1936.

Henry Van Arsdale

Acting Commissioner of Patents.

(Seal)

CERTIFICATE OF CORRECTION.

Patent No. 2,058,778.

October 27, 19:

RAY P. DINSMORE.

It is hereby certified that error appears in the printed specification o the above numbered patent requiring correction as follows: Page 1, first column, line 32, for "in" read is; page 2, second column, line 68, in the last column of the tabulation, for "02.4" read 20.4; page 3, second column line 46, for "safter" read safer; and that the said Letters Patent should read with these corrections therein that the same may conform to the recor( of the case in the Patent Office.

Signed and sealed this 29th day of December, A. D. 1936.

Henry Van Arsdale (Seal)

Acting Commissioner of Patents.